United States Patent [19]
Miller et al.

[11] 3,938,477
[45] Feb. 17, 1976

[54] THRUST BEARING ARRANGEMENT FOR A ROTARY PISTON INTERNAL COMBUSTION ENGINE HAVING A VERTICAL CRANKSHAFT

[75] Inventors: George E. Miller, Libertyville; Michael J. Griffith, Waukegan, both of Ill.; Russell J. Van Rens, Kenosha, Wis.

[73] Assignee: Outboard Marine Corporation, Waukegan, Ill.

[22] Filed: Feb. 20, 1974

[21] Appl. No.: 444,051

[52] U.S. Cl. .......... 123/8.07; 123/8.09; 123/149 D; 418/60
[51] Int. Cl.² ........................................ F02B 53/00
[58] Field of Search ............ 123/8.07, 196 W, 8.09, 123/149 D; 418/60; 115/17 R

[56] References Cited
UNITED STATES PATENTS

| | | | |
|---|---|---|---|
| 1,966,381 | 7/1934 | Doman et al. | 115/17 |
| 2,133,458 | 10/1938 | Lesage | 115/17 X |
| 2,614,497 | 10/1952 | Cowles | 123/196 W X |
| 2,909,146 | 10/1959 | Strang | 115/17 |
| 3,077,867 | 2/1963 | Froede | 123/8.07 |

OTHER PUBLICATIONS
Popular Science, "PS Drives OMC's Hot New Stack--of-Wankels Outboard", Jim Roe, June 1973.

*Primary Examiner*—C. J. Husar
*Assistant Examiner*—Michael Koczo, Jr.
*Attorney, Agent, or Firm*—Michael, Best & Friedrich

[57] ABSTRACT

Disclosed herein is a rotary internal combustion engine comprising housing means defining, in series, first, second, third and fourth trochoid shaped rotor cavities in aligned relation to each other, a rotatably mounted crankshaft including, in series, first, second, third and fourth eccentric portions respectively extending through the first, second, third and fourth cavities, and with the first and fourth crankshaft eccentric portions aligned with respect to each other and with the second and third crankshaft eccentric portions aligned with respect to each other at an angular spacing of 180° from the first and fourth crankshaft eccentric portions, together with first, second, third and fourth rotors respectively rotatably mounted on the first, second, third and fourth crankshaft portions and respectively rotatable in the first, second, third and fourth cavities so as to respectively provide first, second, third and fourth rotating chambers in which combustion takes place, gear means on the housing means and on the rotors for effecting relative rotation between the rotors and the crankshaft and between the crankshaft and the housing means in response to combustion in the chambers, and ignition means for simultaneously initiating combustion in the first and fourth chambers and for simultaneously initiating combustion in the second and third chambers after 180° of crankshaft rotation subsequent to initiation of combustion in the first and fourth chambers.

Also disclosed herein is a rotary internal combustion engine comprising a lower housing assembly including housing means defining first and second trochoid shaped rotor cavities, a lower crankshaft portion rotatably and axially supported by the lower housing assembly, an upper housing assembly located above the lower housing assembly and including housing means defining third and fourth trochoid shaped rotor cavities, and an upper crankshaft portion solely supported for rotation in axial alignment with the lower crankshaft portion by the upper housing assembly, coupling means for connecting the upper and lower crankshaft portions so as to transmit axial and rotary loading from the upper crankshaft portion to the lower crankshaft portion, and means securing together the first and second housing assemblies with the coupling means connecting the upper and lower crankshaft portions.

Also disclosed herein is a crankshaft for a multi-rotor rotary internal combustion engine and including, in series, first, second, third and fourth cylindrically shaped eccentric portions with the first and fourth eccentric portions being in alignment with each other and with the second and third eccentric portions being in alignment with each other and offset from the first and fourth eccentric portions by 180°.

6 Claims, 3 Drawing Figures

THRUST BEARING ARRANGEMENT FOR A ROTARY PISTON INTERNAL COMBUSTION ENGINE HAVING A VERTICAL CRANKSHAFT

BACKGROUND OF THE INVENTION

The invention relates generally to marine propulsion devices such as outboard motors. In addition, the invention relates generally to rotary internal combustion engines and, more particularly, to multi-rotor rotary internal combustion engines and to installations of such engines in marine propulsion devices. In addition, the invention relates to crankshafts for such multi-rotor rotary internal combustion engines.

Attention is directed to the U.S. Strang application Ser. No. 330,596 filed Feb. 8, 1973, and now abandoned, illustrating a marine propulsion device in the form of a low profile outboard motor including a watertight guard or bucket at the top of a lower unit and in encircling relation to an engine.

SUMMARY OF THE INVENTION

The invention provides a rotary internal combustion engine comprising housing means defining, in series, first, second, third and fourth trochoid shaped rotor cavities in aligned relation to each other, together with a crankshaft rotatably mounted by the housing means and including, in series, first, second, third and fourth eccentric portions respectively extending through the first, second, third and fourth cavities, and first, second, third and fourth rotors respectively rotatably mounted on the first, second, third and fourth crankshaft portions and respectively rotatable in the first, second, third and fourth cavities so as to respectively provide first, second, third and fourth rotating chambers in which combustion takes place. The rotors and the eccentric crankshaft portions are angularly related to each other so as to provide rotational balance without counterweighting. In addition, the engine includes gear means on the housing means and on the rotors for effecting relative rotation between the rotors and the crankshaft and between the crankshaft and the housing means in response to combustion in the chambers.

More particularly, the invention provides a crankshaft in which the first and fourth eccentric portions are aligned with respect to each other and the second and third crankshaft eccentric portions are aligned with respect to each other at an angular spacing of 180° from the first and fourth crankshaft eccentric portions.

The invention also provides a rotary internal combustion engine including housing means defining, in series, first, second, third and fourth trochoid shaped rotor cavities in aligned relation to one another, together with a crankshaft rotatably mounted by the housing means and extending through said first, second, third and fourth cavities, and first, second, third and fourth rotors rotatably mounted on the crankshaft and respectively rotatable in the first, second, third and fourth cavities so as to respectively generate first, second, third and fourth rotating chambers in which combustion occurs. In addition, the engine includes ignition means for simultaneously initiating combustion in the first and fourth chambers and for simultaneously initiating combustion in the second and third chambers after 180° of crankshaft rotation subsequent to initiation of combustion in the first and fourth chambers, and gear means on the housing means and on the rotors for effecting relative rotation between the rotors and the crankshaft and between the crankshaft and the housing means in response to combustion in the chambers.

In further accordance with the invention, the engine includes a lower housing assembly including the first and second rotor cavities and an upper housing assembly including the third and fourth rotor cavities, and the crankshaft includes a lower portion in the lower housing assembly including first and second eccentric portions located at 180° from each other, and an upper crankshaft portion in the upper housing assembly and including third and fourth eccentric portions located at 180° from each other, together with coupling means on the upper and lower crankshaft portions and connecting the upper and lower crankshaft portions with the first and fourth eccentric portions in alignment with each other and with the second and third eccentric portions in alignment with each other.

In further accordance with the invention, the ignition means comprises a capacitor connected, in series, with each of two electronic switches each including a control terminal, with each of the electronic switches being connected to two ignition coils respectively including secondary ignition coils connected to respective spark plugs operably mounted in the first, second, third and fourth rotor cavities, a charge coil connected to the capacitor for charging thereof, a charge magnet rotated by the crankshaft in relation to the charge coil to effect charging of the capacitor, a trigger coil having opposite ends respectively connected to the control terminals of the electronic switches, and magnet means rotated by the crankshaft in relation to the trigger coil for producing in the trigger coil, for each rotation of the crankshaft, one pulse of one polarity and, after 180° of crankshaft rotation, another pulse of the opposite polarity.

Still further, the invention provides a rotary internal combustion engine comprising a lower housing assembly including housing means defining first and second trochoid shaped rotor cavities, a lower crankshaft portion, and bearing means on the lower housing assembly for rotatably and axially supporting the lower crankshaft portion, together with an upper housing assembly located above the lower housing assembly and including housing means defining third and fourth trochoid shaped rotor cavities, an upper crankshaft portion, and bearing means on the upper housing assembly solely supporting the upper crankshaft portion for rotation in axial alignment with the lower crankshaft portion, coupling means for connecting the upper and lower crankshaft portions so as to transmit axial and rotary loading from the upper crankshaft portion to the lower crankshaft portion, and means securing together the first and second housing assemblies with the coupling means connecting the upper and lower crankshaft portions.

In further accordance with the invention, the lower crankshaft portion includes an annular shoulder engaging the bearing means in the lower housing assembly to provide the sole axial support for the crankshaft.

The invention also provides a crankshaft for a multi-rotor rotary internal combustion engine, which crankshaft includes, in series, first, second, third and fourth cylindrically shaped eccentric portions with the first and fourth eccentric portions being in alignment with each other and with the second and third eccentric portions being in alignment with each other and offset from the first and fourth eccentric portions by 180°.

In further accordance with the invention, the crankshaft includes a first portion including the first and second eccentric portions, and a second portion physically separate from the first portion and including the third and fourth eccentric portions, together with coupling means on the first and second crankshaft portions for connecting the first and second crankshaft portions to each other and with the first, second, third and fourth eccentric portions in series, and for transmitting torque therebetween.

One of the principal features of the invention is the provision of a four-rotor rotary internal combustion engine which is balanced without the aid of crankshaft counterweighting.

Another of the principal features of the invention is the provision of a rotary internal combustion engine including, in series, first, second, third and fourth aligned rotor cavities and ignition means for simultaneously initiating combustion in the first and fourth cavities and, after 180° of crankshaft rotation, for simultaneously initiating combustion in the second and third rotor cavities.

Still another of the features of the invention is the provision, in a rotary internal combustion engine, of a split crankshaft including two physically separate portions, together with coupling means for connecting the physically separate portions to transmit axial and rotary loading, and means for axially supporting only one of the crankshaft portions from the engine.

Still another of the features of the invention is the provision of a crankshaft for a rotary internal combustion engine, which crankshaft includes, in series, first, second, third and fourth cylindrically shaped eccentric portions, with the first and fourth eccentric portions being in alignment with each other at an angular spacing of 180° from the second and third eccentric portions.

Another of the principal features of the invention is the provision of a multi-rotor rotary internal combustion engine which incorporates substantially identically constructed housing members at least partially defining rotor cavities.

Still another of the features of the invention is the provision of a marine propulsion device in the form of an outboard motor including a multi-rotor rotary internal combustion engine.

Other features and advantages of the invention will become known by reference to the following drawings, general description, and claims.

THE DRAWINGS

Figure 1:
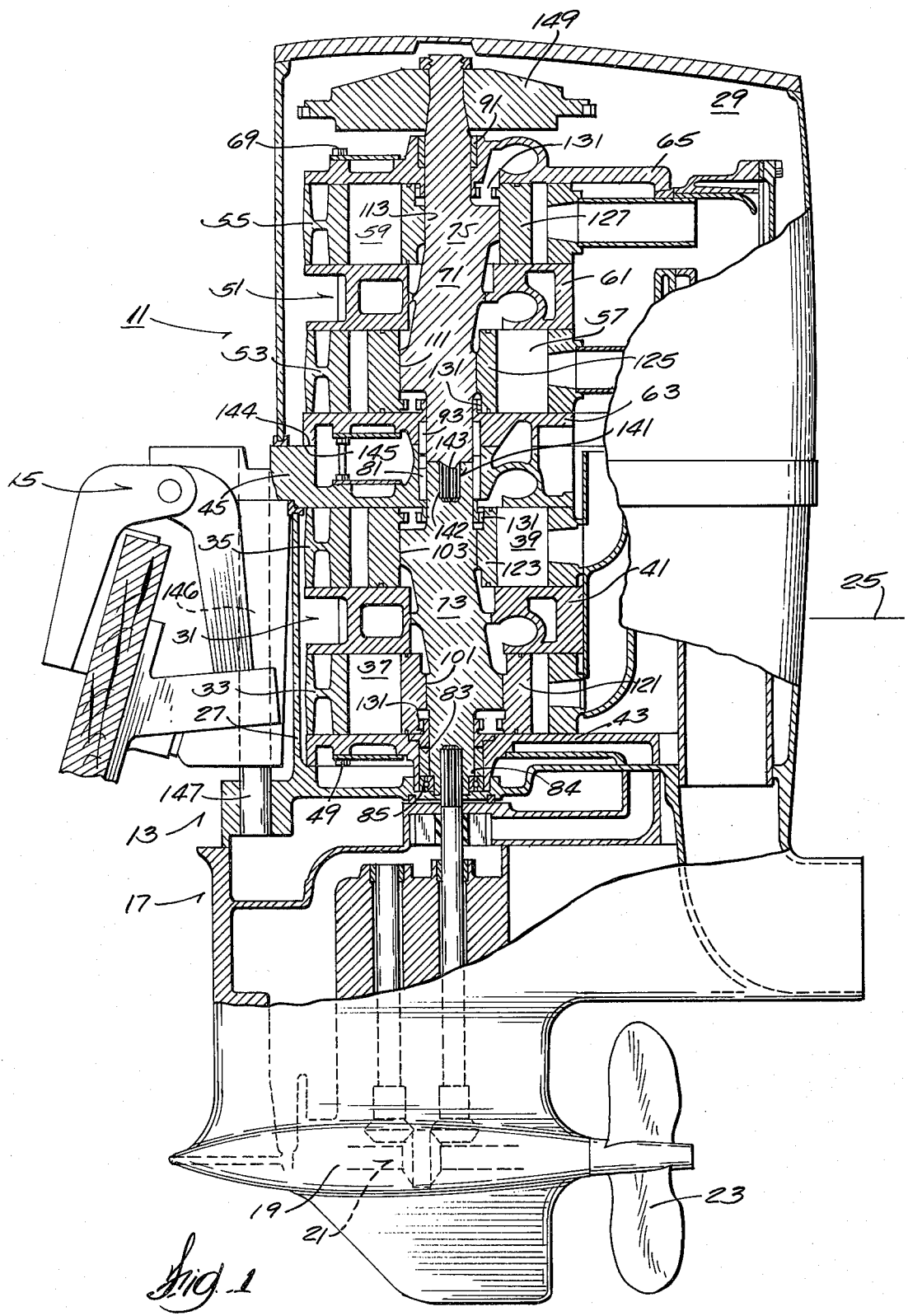
FIG. 1 is a side elevational view, partially broken away, partially in section, and partially schematic of a marine propulsion device in the form of an outboard motor including a multi-rotor rotary internal combustion engine.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not or limitation.

GENERAL DESCRIPTION

Shown in the drawings is an outboard motor 11 which includes a propulsion unit 13 adapted to be connected to the stern of a boat by attachment means 15 affording horizontal swinging or steering movement of the propulsion unit 13 relative to the boat and affording vertical swinging movement of the propulsion unit 13 relative to the boat. Any suitable construction can be employed for such attachment means 15.

The propulsion unit 13 comprises a lower unit 17 including a gear box 19 which can include a reversing transmission 21 and which rotatably supports a propeller 23 adapted to be driven by the transmission 21. Extending at the top of the lower unit 17 to above the at-rest water line 25 is a bucket or water guard 27. Also, rigidly mounted on the top of the lower unit 17 within the bucket or water guard 27 is a rotary internal combusiton engine 29.

In accordance with a part of the invention, the rotary engine 29 is assembled from a vertically extending series of horizontally extending adjacent members, each of which includes one or more flat surfaces mating with the adjacent flat surface of the adjacently located member.

In accordance with another part of the invention, the engine 29 comprises two housing assemblies, each of which includes two rotor cavities. More particularly, the engine 29 includes a lower housing assembly 31 comprising substantially identical lower and upper housing members 33 and 35 respectively including wall means partially defining first and second or lower and upper trochoid shaped rotor cavities 37 and 39. Located between the lower and upper housing members 33 and 35 is an intermediate member 41 which further defines the lower and upper rotor cavities 37 and 39. Located below the lower housing member 37 is a lower end wall member 43 which further defines the lower rotor cavity 37, and located above the upper housing member 39 is an upper end wall member 45 which further defines the upper rotor cavity 39. The lower and upper housing members 33 and 35, the intermediate member 41, and the lower and upper end wall members 43 and 45 are assembled in parallel relation to one another with the trochoid shaped cavities in aligned relation by any suitable means, such as a plurality of spaced bolts 49.

The engine 29 also includes an upper housing assembly 51 including lower and upper substantially identical housing members 53 and 55 which are also substantially identical to the housing members 33 and 35 and which respectively include wall means partially defining third and fourth or lower and upper trochoid shaped rotor cavities 57 and 59. Located between the lower and upper housing members 53 and 55 is an intermediate member 61 which further defines the lower and upper rotor cavities 57 and 59. Located below the lower housing member 53 is a lower end wall member 63 which further defines the lower rotor cavity 57, and located above the upper housing member 55 is an upper end wall member 65 which further defines the upper rotor cavity 59. The lower and upper housing members 53 and 55, the intermediate member 61, and the lower and upper end wall members 63 and 65 are assembled in parallel relation to each other with the trochoid shaped cavities in aligned relation by any suitable means, such as a plurality of spaced bolts 69.

Figure 2:
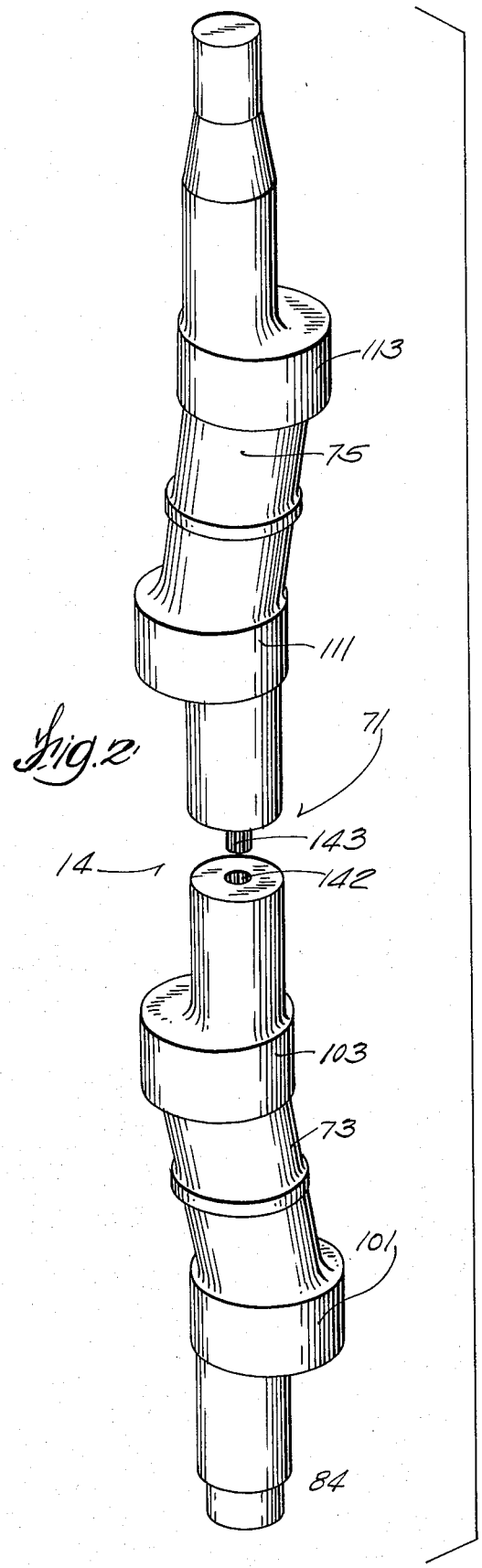
FIG. 2 is an exploded and enlarged perspective view of the crankshaft employed in the engine shown in FIG. 1.

Extending vertically through the lower and upper housing assemblies 31 and 51 is a crankshaft 71 which includes (See also FIG. 2) a lower crankshaft portion 73 extending through the lower and upper rotor cavities 37 and 39 in the lower housing assembly 31, and an upper crankshaft portion 75 which is physically separate from the lower crankshaft portion 73 and which extends through the lower and upper rotor cavities 57 and 59 in the upper housing assembly 51.

More specifically, the lower crankshaft portion 73 is rotatably supported by an upper radial bearing 81 mounted in the upper end wall member 45 of the lower housing assembly 31, is radially supported by a lower radial bearing 83 mounted in the lower end wall member 43 of the lower housing assembly 31, and is axially supported along an annular shoulder 84 by a thrust bearing 85 mounted on the lower end wall member 43 of the lower housing assembly 31. The upper crankshaft portion 75 is rotatably supported by an upper radial bearing 91 mounted in the upper wall end member 65 of the upper housing assembly 51, and is also radially supported by a lower radial bearing 93 mounted in the lower end wall member 65 of the upper housing assembly 51. In accordance with another part of the invention, the upper crankshaft portion 75 is not axially supported by the upper housing assembly 51, but relies upon the axial support afforded to the lower crankshaft portion 73 by the thrust bearing 85.

The crankshaft 71 includes eccentric portions which are arranged so as to balance the overall engine without employment of counterweights. In this regard, the lower crankshaft portion 73 includes first and second or lower and upper eccentric portions 101 and 103 which are cylindrically shaped and which respectively extend in the lower and upper rotor cavities 37 and 39 of the lower housing assembly 31, and the upper crankshaft portion 75 includes third and fourth or lower and upper eccentric portions 111 and 113 which are cylindrically shaped and which respectively extend in the lower and upper rotor cavities 57 and 59 of the upper housing assembly 51. Still more specifically, the first and fourth eccentric portions 101 and 113 are aligned with each other, and the second and third eccentric portions 103 and 111 are aligned with each other but angularly offset from the first and fourth eccentric portions 101 and 113 by 180°.

Respectively rotatable in each of the first, second, third, and fourth rotor cavities 37, 39, 57 and 59 to thereby generate first, second, third and fourth rotatable combustion chambers in which combustion takes place, are first, second, third and fourth rotors 121, 123, 125 and 127 which are respectively rotatably mounted on the first, second, third and fourth crankshaft eccentric portions 101, 103, 111 and 113. Each of the rotors 121, 123, 125 and 127 is generally triangular in shape.

Provided on each of the rotors 121, 123, 125 and 127 and on the associated housing assemblies 31 and 59 is gear means 131 for effecting relative rotation between the rotors 121, 123, 125 and 127 and the housing assemblies 31 and 59 and between the rotors 121, 123, 125 and 127 and the crankshaft 71 in response to combustion in the rotating chambers. In the illustrated construction, each rotor rotates once for each three revolutions of the crankshaft 71. In addition, the gear means 131 on the housing assemblies 31 and 51 are provided by bolting a gear member to the upper and lower end wall members of each housing assembly.

In order to operatively unify the crankshaft portions 73 and 75, coupling means 141 are provided therebetween in such manner as to maintain the crankshaft portions 73 and 75 in proper angular relation to each other, to resist bending therebetween, and to transmit torque. In addition, as already pointed out, the coupling means 141 transmits any axial load from the upper crankshaft portion 75 to the lower crankshaft portion 73. Any suitable coupling means can be employed. In the illustrated construction, the coupling means is provided by a splined female socket 142 in the upper end of the lower crankshaft portion 73 and by a mating splined projection 143 which extends from the lower part of the upper crankshaft portion 75 into the socket 142.

Means are also provided for securing together the upper and lower housing assemblies 31 and 51 with all of the trochoid shaped cavities 37, 39, 57 and 59 in alignment with one another and with the lower and upper crankshaft portions 73 and 75 connected by the coupling means 141. In the illustrated construction, such securing means is provided by through bolts (not shown) extending through the upper and lower housing assemblies. In this last regard, the upper end wall member 45 of the lower housing assembly 31 includes pads or flat surfaces 144 which bear against cooperating flat surfaces 145 on the lower end wall member 63 of the upper housing assembly 51. As also can be seen from the drawings, the upper end wall member 45 of the lower housing assembly 31 extends forwardly above the guard or bucket 27 and is connected to the upper end of a kingpin 146 forming a part of the beforementioned attachment means 15. At its lower end, the kingpin 146 extends into the lower unit 17 at 147.

The upper crankshaft portion 75 extends above the upper end wall member 65 and is connected to a flywheel 149 which carries various components of an ignition means 151 for simultaneously initiating combustion in the first and fourth rotary chambers and for simultaneously initiating combustion in the second and third rotary chambers after 180 degrees of crankshaft rotation subsequent to the initiation of combustion in the first and fourth rotary chambers.

Figure 3:
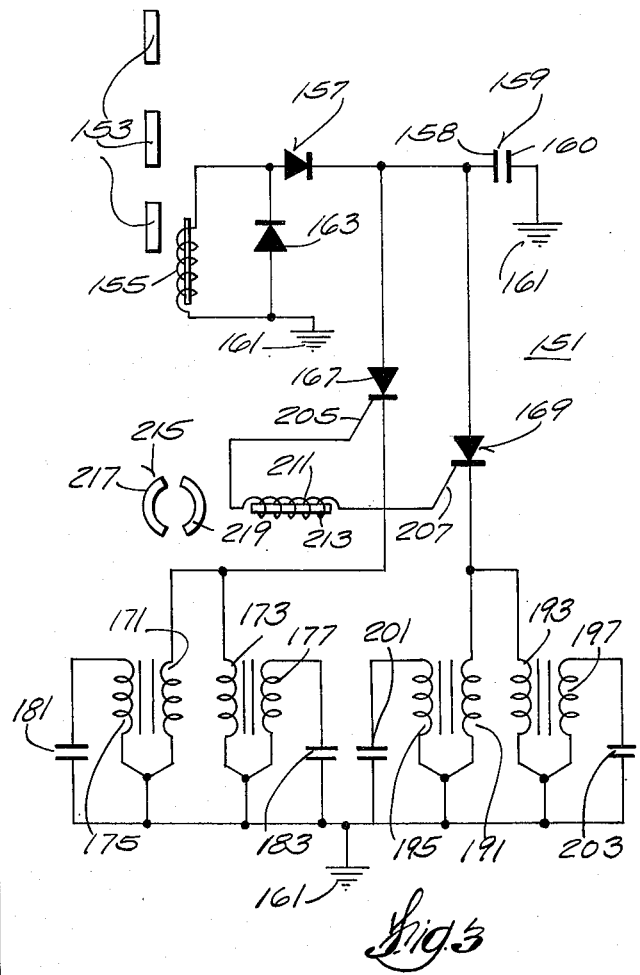
FIG. 3 is a schematic wiring diagram of the ignition system employed in the engine shown in FIG. 1.

In this last regard, and as shown schematically in FIG. 3, the flywheel 149 carries a plurality of charge magnets 153 which rotate past a charge coil 155. At least one of the magnets 153 travels past the charge coil during each 180° of crankshaft rotation. At one end, the charge coil 155 is connected to the anode of a diode 157 having a cathode which, in turn, is connected to the first plate 158 of a charge capacitor 159. The other plate 160 of the capacitor 159 is connected to ground 161.

At its other end, the charge coil 155 is connected to ground 161 and to the anode of a diode 163 having a cathode which, in turn, is connected between the charge coil 155 and the anode of the diode 157. In turn, the first plate 158 of the capacitor 159 is also connected to electronic switches arranged in parallel. While other constructions could be employed, in the illustrated construction, the switches comprise two SCR's 167 and 169. In turn, the SCR 167 includes a cathode connected to two primary coils 171 and 173 arranged in parallel and connected to ground 161. The respective primary coils 171 and 173 have associated therewith respective secondary coils 175 and 177 which are connected to ground 161 through respective spark plugs 181 and 183 which are respectively mounted in the housing members 33 and 55 and are operatively associated with the first and fourth rotating chambers.

The other SCR 169 includes a cathode connected to two primary coils 191 and 193 arranged in parallel and connected to ground. The respective primary coils 191 and 193 have associated therewith respective secondary coils 195 and 197 respectively connected to ground 161 through respective spark plugs 201 and 203 which are respectively mounted in the housing members 35 and 53 and are operatively associated with the second and third rotating chambers.

The SCR 167 includes a control terminal or gate 205 which is triggered in response to a pulse of one polarity, and the other SCR 169 includes a control terminal or gate 207 which is triggered in response to a pulse of the other polarity. The gates 205 and 207 are respectively connected to the opposite ends of a trigger coil 211 mounted on a core 213 extending radially of an annular magnet 215 which is carried by the flywheel 149 and which includes one segment 217 of one polarity with an arcuate extent of approximately 180° and further including a second segment 219 of the other polarity with an arcuate extent of approximately 180°. Accordingly, in operation, the ignition system 151 causes charging of the capacitor after every ignition and before the next ignition, causes simultaneous sparking or combustion initiation in the first and fourth chambers, and after 180° of crankshaft rotation, causes subsequent simultaneous sparking in the second and third rotating chambers.

Various of the features of the invention are set forth in the following claims.

We claim:

1. An internal combustion engine comprising a lower housing assembly including first and second trochoid shaped rotor cavities in aligned relation to each other, said lower housing assembly also including a thrust bearing, an upper housing assembly including third and fourth trochoid shaped rotor cavities in aligned relation to each other and to said first and second cavities, a crankshaft including, in series, first, second, third, and fourth eccentric portions respectively extending through said first, second, third, and fourth cavities, said crankshaft including a lower portion rotatably supported in said lower housing assembly and including first and second eccentric portions located at 180° from each other, said lower crankshaft portion also including an annular shoulder engaged with said thrust bearing to transmit axial loading from said lower crankshaft portion to said lower housing assembly and constituting the sole axial support for said crankshaft and an upper crankshaft portion rotatably supported in said upper housing assembly and including said third and fourth eccentric portions located at 180° from each other, and coupling means on said upper and lower crankshaft portions for connecting said upper and lower crankshaft portions with said first and fourth eccentric portions in alignment with each other and with said second and third eccentric portions in alignment with each other and for transmitting axial loading from said upper crankshaft portion to said lower crankshaft portion, first, second, third, and fourth rotors respectively rotatably mounted on said first, second, third and fourth crankshaft portions and respectively rotatable in said first, second, third, and fourth cavities so as to respectively provide first, second, third, and fourth rotating chambers in which combustion takes place, said rotors and said eccentric crankshaft protions being angularly related to each other so as to provide rotational balance without counterweighting, and gear means on said housing means and on said rotors for effecting relative rotation between said rotors and said crankshaft and between said crankshaft and said housing means in response to combustion in said chambers.

2. A rotary internal combustion engine in accordance with claim 1 wherein said first and fourth crankshaft eccentric portions are aligned with respect to each other and said second and third crankshaft eccentric portions are aligned with respect to each other at an angular spacing of 180° from said first and fourth crankshaft eccentric portions, and further including ignition means for simultaneously initiating combustion in said first and fourth chambers and for simultaneously initiating combustion in said second and third chambers after 180° of crankshaft rotation subsequent to initiation of combustion in said first and fourth chambers.

3. A rotary internal combustion engine including a lower housing assembly including first and second trochoid shaped rotor cavities in aligned relation to each other, said lower housing assembly also including a thrust bearing, an upper housing assembly including third and fourth trochoid shaped rotor cavities in aligned relation to each other and to said first and second rotor cavities, a crankshaft extending through said first, second, third, and fourth cavities, said crankshaft including a lower portion rotatably supported in said lower housing assembly and including first and second eccentric portions located at 180° from each other, said lower crankshaft portion also including an annular shoulder engaged with said thrust bearing to transmit axial loading from said lower crankshaft portion to said lower housing assembly and constituting the sole axial support for said crankshaft and an upper crankshaft portion rotatable in said upper housing assembly and including third and fourth eccentric portions located at 180° from each other, and coupling means on said upper and lower crankshaft portions for connecting said upper and lower crankshaft portions with said first and fourth eccentric portions in alignment with each other and with said second and third eccentric portions in alignment with each other and for transmitting axial loading from said upper crankshaft portion to said lower crankshaft portion, first, second, third, and fourth rotors rotatably mounted on said crankshaft and respectively rotatable in said first, second, third, and fourth cavities so as to respectively generate first, second, third, and fourth rotating chambers in which combustion occurs, ignition means for simultaneously initiating combustion in said first and fourth chambers and for simultaneously initiating combustion in said second and third chambers after 180° of crankshaft rotation subsequent to initiation of combustion in said first and fourth chambers, and gear means on said housing means and on said rotors for effecting relative rotation between said rotors and said crankshaft and between said crankshaft and said housing means in response to firing of said chambers.

4. A rotary internal combustion engine comprising a lower housing assembly including housing means defining first and second trochoid shaped rotor cavities, a lower crankshaft portion, and bearing means on said lower housing assembly for rotatably and axially supporting said lower crankshaft portion, an upper housing assembly located above said lower housing assembly and including housing means defining third and fourth trochoid shaped rotor cavities, an upper crankshaft portion, and bearing means on said upper housing assembly solely supporting said upper crankshaft portion for rotation in axial alignment with said lower crankshaft portion, coupling means on said upper and lower crankshaft portions for connecting said upper and lower crankshaft portions so as to transmit axial and rotary loading from said upper crankshaft portion to said lower crankshaft portion whereby said bearing means on said lower housing assembly provides the sole axial support for both said upper and lower crankshaft portions, and means securing together said first and second housing assemblies with said coupling means connecting said upper and lower crankshaft portions.

5. A rotary internal combustion engine in accordance with claim 4 wherein said lower crankshaft portion includes an annular shoulder, and wherein said lower housing assembly includes a thrust bearing engaged with said annular shoulder to receive axial loading from lower crankshaft portion and constituting the sole axial support for said crankshaft.

6. A rotary internal combustion engine in accordance with claim 4 wherein said lower crankshaft portion includes first and second eccentric portions located at 180° from each other, wherein said upper crankshaft portion includes third and fourth eccentric portions located at 180° from each other, and said coupling means locates said first and fourth eccentric portions in alignment with each other and said second and third eccentric portions in alignment with each other.

* * * * *

UNITED STATES PATENT OFFICE
CERTIFICATE OF CORRECTION

Patent No. 3,938,477      Dated February 17, 1976

Inventor(s) George E. Miller et al.

It is certified that error appears in the above-identified patent and that said Letters Patent are hereby corrected as shown below:

Column 10, lines 3 and 4, delete "lower housing assembly" and insert -- bearing means --.

Signed and Sealed this

Fifth Day of October 1976

[SEAL]

Attest:

RUTH C. MASON
*Attesting Officer*

C. MARSHALL DANN
*Commissioner of Patents and Trademarks*